US012753839B2

(12) United States Patent
Müller

(10) Patent No.: US 12,753,839 B2
(45) Date of Patent: Oct. 6, 2026

(54) MECHANICAL SEAL ARRANGEMENT

(71) Applicant: EagleBurgmann Germany GmbH & Co. KG, Wolfratshausen (DE)

(72) Inventor: Michael Müller, Bichl (DE)

(73) Assignee: EagleBurgmann Germany GmbH & Co. KG, Wolfratshausen (DE)

( * ) Notice: Subject to any disclaimer, the term of this patent is extended or adjusted under 35 U.S.C. 154(b) by 0 days.

(21) Appl. No.: 19/145,139

(22) PCT Filed: Nov. 28, 2023

(86) PCT No.: PCT/EP2023/083301
§ 371 (c)(1),
(2) Date: Jul. 1, 2025

(87) PCT Pub. No.: WO2024/153376
PCT Pub. Date: Jul. 25, 2024

(65) Prior Publication Data

US 2026/0218793 A1 Jul. 30, 2026

(30) Foreign Application Priority Data

Jan. 16, 2023 (DE) ..................... 10 2023 100 830.7

(51) Int. Cl.
*F16J 15/34* (2006.01)

(52) U.S. Cl.
CPC ....... *F16J 15/3492* (2013.01); *F16J 15/3452* (2013.01); *F16J 15/3496* (2013.01)

(58) Field of Classification Search
CPC ... F16J 15/3452; F16J 15/3492; F16J 15/3496
See application file for complete search history.

(56) References Cited

U.S. PATENT DOCUMENTS 4,691,276 A * 9/1987 Miller .................... F16J 15/346 277/377
8,540,249 B2 * 9/2013 Prellwitz ............. F16J 15/3492 277/358

(Continued)

FOREIGN PATENT DOCUMENTS

DE 19723327 A1 * 12/1998 ............... G01N 3/56
DE 102018000935 A1 5/2019

(Continued)

OTHER PUBLICATIONS

International Search Report issued in PCT/EP2023/083301, mailed Feb. 19, 2024.

*Primary Examiner* — Nicholas L Foster
(74) *Attorney, Agent, or Firm* — Troutman Pepper Locke LLP; Scott D. Wofsy

(57) ABSTRACT

The present invention relates to a mechanical seal arrangement configured for sealing at a rotating component (22), comprising: a mechanical seal (2) having a rotating slide ring (3) with a sliding surface (3*a*) and a stationary slide ring (4) with a sliding surface (4*a*), which define a sealing gap (5) between the sliding surfaces (3*a*, 4*a*), wherein the rotating slide ring (3) and the stationary slide ring (4) are produced from an electrically conductive material, wherein the rotating slide ring (3) is electrically connected to the rotating component (22), and a monitoring device (6) comprising an electrical circuit (7), a measuring unit (60) and an evaluation unit (61), wherein the electrical circuit (7) comprises a first line (71) which electrically connects the stationary slide ring (4) to a voltage source (70), a second line (72) which electrically connects the rotating component (22) to the voltage source (70), and a capacitor (73), wherein the capacitor (73) is configured as a plate capacitor, wherein the plate capacitor is formed by the rotating slide ring (3) and the stationary slide ring (4), wherein the measuring unit (60)

(Continued)

Figure 1:
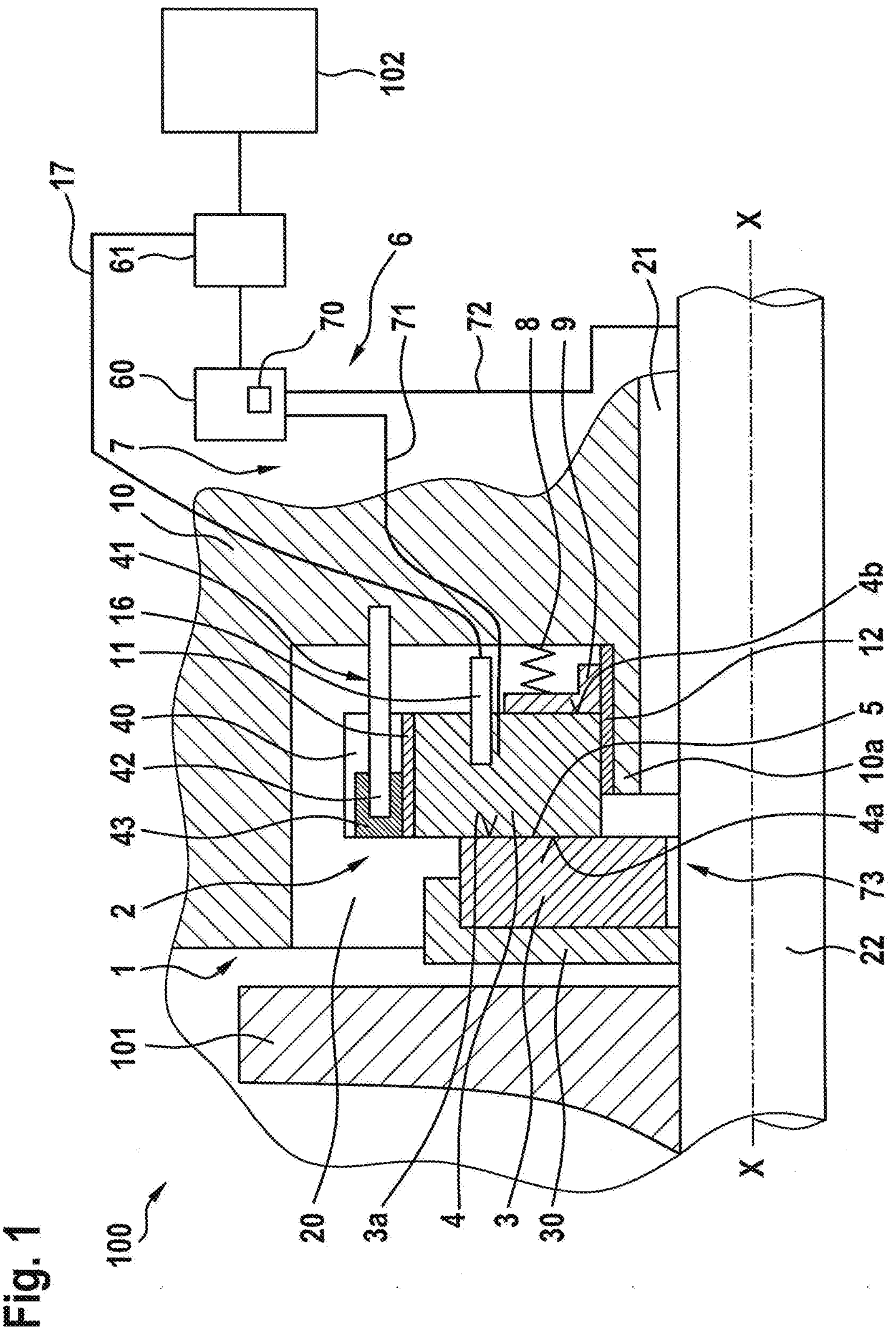

is configured for acquiring changes of electrical variables of the electrical circuit (7), and wherein the evaluation unit (61) is configured for performing an evaluation of the electrical variables acquired by the measuring unit (60).

15 Claims, 3 Drawing Sheets

(56) References Cited

U.S. PATENT DOCUMENTS

| | | | | |
|---|---|---|---|---|
| 8,651,801 | B2 * | 2/2014 | Shamseldin | F16J 15/3484 415/112 |
| 9,790,952 | B2 * | 10/2017 | Shamseldin | F16J 15/3492 |
| 10,690,250 | B2 * | 6/2020 | Nahrwold | F16J 15/3296 |
| 11,867,292 | B2 * | 1/2024 | Korupp | F16J 15/022 |
| 12,007,032 | B2 * | 6/2024 | Otschik | F16J 15/3492 |
| 12,152,675 | B2 * | 11/2024 | Ledig | F16J 15/3484 |
| 12,631,512 | B2 * | 5/2026 | Werdecker | F16J 15/3492 |
| 12,655,908 | B2 * | 6/2026 | Lang | F16J 15/3492 |
| 2009/0290971 | A1 * | 11/2009 | Shamseldin | F04D 29/124 415/118 |
| 2010/0171269 | A1 | 7/2010 | Prellwitz | |
| 2014/0161587 | A1 * | 6/2014 | Shamseldin | F16J 15/3492 73/40 |
| 2018/0112779 | A1 * | 4/2018 | Nahrwold | F16J 15/3296 |
| 2020/0124180 | A1 * | 4/2020 | Korupp | F16J 15/022 |
| 2022/0412465 | A1 * | 12/2022 | Lang | F16J 15/3492 |
| 2023/0366468 | A1 * | 11/2023 | Otschik | G05B 23/0237 |
| 2023/0375089 | A1 * | 11/2023 | Ledig | F16J 15/3484 |
| 2025/0003498 | A1 * | 1/2025 | Suszniak | F16J 15/3496 |
| 2025/0035214 | A1 * | 1/2025 | Korupp | G01N 19/02 |
| 2025/0084924 | A1 * | 3/2025 | Otschik | F16J 15/3492 |
| 2026/0016091 | A1 * | 1/2026 | Müller | F16J 15/3492 |
| 2026/0168578 | A1 * | 6/2026 | Kreft | F16J 15/3436 |

FOREIGN PATENT DOCUMENTS

| | | | | |
|---|---|---|---|---|
| DE | 102021116015 | A1 | 12/2021 | |
| EP | 3450803 | B1 | 3/2020 | |
| WO | WO-2024153377 | A1 * | 7/2024 | G01B 7/08 |

* cited by examiner

MECHANICAL SEAL ARRANGEMENT

CROSS-REFERENCE TO RELATED APPLICATIONS

This application is a U.S. National Phase Application filed under 35 U.S.C. § 371, based on International Patent Application No. PCT/EP2023/083301, filed Nov. 28, 2023, which claims priority to German Patent Application No. DE 10 2023 100 830.7, filed on Jan. 16, 2023, which are incorporated herein by reference.

The present invention relates to a mechanical seal arrangement and a machine comprising a mechanical seal arrangement according to the invention, which allows for state monitoring of a mechanical seal.

Mechanical seal arrangements are known in various embodiments. In this case, mechanical seal arrangements seal a product space from an atmosphere at a rotating component, for example a shaft, a machine, e.g. a compressor, a pump or stirrers or the like. In this case, mechanical seal arrangements frequently have to perform a sealing task under extreme conditions, e.g. high temperatures, high pressures and/or toxic media. In order to prevent complications during operation, the mechanical seal arrangement should be able to seal as far as possible in all operating situations and optionally be replaced before failure, in order to prevent unplanned standstills of the machine or endangering people and the environment due to a damaged mechanical seal. In this case, it is difficult to identify when there is a risk of the mechanical seal failing.

The object of the present invention is therefore that of providing a mechanical seal arrangement and a machine comprising a mechanical seal arrangement which allows for the most reliable possible state acquisition of a mechanical seal with a simple design and simple, cost-effective producibility.

This object is achieved by a mechanical seal arrangement having the features of claim 1, and a machine having the features of claim 14. The dependent claims in each case disclose preferred developments of the invention.

The mechanical seal arrangement according to the invention, having the features of claim 1, has the advantage that state acquisition of a mechanical seal is made possible in a relatively simple manner. In this case, in particular structural changes to the mechanical seal arrangement can be kept very small, such that state monitoring can be used even in the case of established designs of mechanical seal arrangements. It is thus possible to ensure that a performance of a mechanical seal arrangement is not influenced disadvantageously by the state monitoring.

This is achieved according to the invention in that the mechanical seal arrangement comprises a mechanical seal having a rotating and a stationary slide ring which define a sealing gap between their sliding surfaces. In this case, the stationary and rotating slide ring are produced from an electrically conductive material. In this case, the stationary and rotating slide ring are preferably produced from a ceramic, electrically conductive composite material. Furthermore, the rotating slide ring is directly or indirectly electrically connected to a rotating component at which the mechanical seal arrangement provides sealing. In this case, the mechanical seal arrangement comprises a monitoring device comprising an electrical circuit, a measuring unit and an evaluation unit. The electrical circuit comprises a first line which connects the stationary slide ring to a voltage source, a second line which connects the rotating component to the voltage source, and a capacitor. The capacitor is configured as a plate capacitor, wherein the plate capacitor is formed by the rotating slide ring and the stationary slide ring. Thus, the rotating and the stationary slide ring in each case form capacitor plates of the plate capacitor, such that the two slide rings constitute an electrical component. The measuring unit is configured to acquire changes of electrical variables of the circuit, and the evaluation unit is configured to perform an evaluation of the electrical variables acquired by the measuring unit.

Thus, components of the mechanical seal arrangement itself are used as parts of the electrical circuit of the monitoring device, such that monitoring of the mechanical seal arrangement is possible with a very small number of additional components. Thus, a particularly simple design can be achieved and the monitoring device can be configured in a very cost-effective manner. The monitoring device according to the invention also allows for permanent monitoring of the state of the mechanical seal arrangement during operation, without problem. Should there be signs of changes of the acquired electrical variables, a possible replacement of the mechanical seal or other components of the mechanical seal or other components of the mechanical seal arrangement can be planned early, without a serious failure occurring in the operation of the mechanical seal arrangement.

Preferably a barrier fluid, which is located in the sealing gap between the sliding surfaces of the slide rings during operation, is a dielectric. As a result, the capacitor comprising the slide rings can be provided very easily.

Alternatively or in addition, an electrically non-conductive coating is formed on at least one of the sliding surfaces, preferably on both sliding surfaces. The electrically non-conductive coating electrically insulates the sliding surfaces of the rotating and stationary slide ring, such that a statement of state regarding the mechanical seal arrangement can be made even in the case of a standstill or low speeds of the mechanical seal arrangements, in which the sliding surfaces of the slide rings are in contact. Should e.g. the electrically insulating coating on the sliding surfaces be removed due to wear, in the case of a standstill and contact of the sliding surfaces the electrical circuit of the monitoring device would close at the sliding surfaces, which directly indicates wear of the coatings of the sliding surfaces. Then, corresponding countermeasures can be taken, for example replacing the slide rings.

The electrically non-conductive coating on the sliding surfaces is preferably a DLC coating (diamond-like carbon coating).

In order to electrically insulate the stationary slide ring relative to a housing, preferably an electrically non-conductive element is present between the stationary slide ring and the housing. In this case, for example an electrically non-conductive coating, for example a DLC coating, can again be provided on the housing and/or on the stationary slide ring.

According to a further preferred embodiment of the invention, the mechanical seal arrangement further comprises a torque transmission device on the stationary slide ring, which is electrically insulated with respect to the stationary slide ring and/or with respect to the housing. In this case, the torque transmission device is configured to prevent co-rotation of the stationary slide ring during operation. The torque transmission device is for example a torque pin, which is fixed at one end in the housing and holds the stationary slide ring in a non-rotatable manner at the other end. In this case, the pin can be arranged on the stationary slide ring for example in a groove on the outer periphery or in a blind hole in the slide ring.

The pin particularly preferably has a cap made of an electrically non-conductive material, in particular PEEK, in order to ensure the electrical insulation between the stationary slide ring and the housing.

Further preferably, the mechanical seal arrangement further comprises a pretensioning device and a pressure ring, which are arranged on a rear side of the stationary slide ring. The pretensioning device preloads the stationary slide ring in the axial direction X-X against the rotating slide ring, wherein the pretensioning device is also electrically insulated with respect to the stationary slide ring. This can be made possible in a simple manner in that the pressure ring is produced from an electrically non-conductive material or a coating of an electrically non-conductive material is provided on a rear side of the stationary slide ring or on the pressure ring.

A particularly preferred embodiment of the invention is achieved when the stationary slide ring comprises an electrically non-conductive coating completely on all the outer surfaces. Electrical contacting of the stationary slide ring by means of the first line then has to take place through an opening formed in the coating.

Particularly preferably, the evaluation unit is configured to compare measured variables of the electrical circuit, measured by the measuring unit, with comparison variables, in order to identify deviations. In any case, a warning message or the like can then be emitted. Comparison variables are for example preceding measured variables which were recorded by the measuring unit, and/or predetermined comparison variables from tests, which are stored in a memory.

Particularly preferably, the evaluation unit is configured to determine a magnitude of the sealing gap in the axial direction X-X of the mechanical seal on the basis of the acquired electrical measured variables. In this way, a possible leak via the sealing gap of the mechanical seal can be detected in a simple manner.

Preferably, the evaluation unit is configured to determine wear of the sliding surfaces of the slide rings and/or wear of the torque transmission device.

Further preferably, the mechanical seal arrangement further comprises a temperature sensor which is connected to the evaluation unit and is configured for acquiring a temperature of at least one slide ring. The additional temperature sensor provides a further possibility for monitoring the slide rings.

Further preferably, the evaluation unit is configured to determine a change in a magnitude of the sealing gap based on the temperature change acquired by the temperature sensor. In particular, a sudden temperature changes occurs if the sliding surfaces come into contact during operation of a machine. This leads to contact friction between the sliding surfaces, which results in an increase in temperature of the slide rings. This can be acquired by the temperature sensor and the evaluation unit can accordingly output a warning signal.

Knowledge about contact of the sliding surfaces is important for example in the case of shutting down large machines such as compressors, turbines or the like, which, for thermal reasons, have to be operated in slow running operation, known as slow-roll operation, over a long period of time. It is advantageous here if the speed for such slow running can be brought as close as possible to a speed at which contact between the sliding surfaces could occur. In this case, it is essential to prevent the sliding surfaces remaining in contact for a longer period of time during slow running, since this would lead to destruction of the mechanical seal.

A temperature jump also occurs when starting up a machine, specifically after the speed-dependent timepoint at which lifting of the sliding surfaces, which are in contact with one another upon standstill, occurs. Then, owing to the occurring sealing gap between the sliding surfaces, a drop in temperature of the slide rings occurs, since there is no longer any contact friction between the sliding surfaces. Furthermore, slow running may also be necessary in standby operation of a machine, in order to allow for quicker startup of the machine.

Thus, in particular when the sliding surfaces comprise electrically non-conductive coatings, the evaluation of the measured variables of the temperature sensor can directly make it possible for a conclusion to be drawn regarding a sealing gap magnitude and/or the presence of contact friction between the sliding surfaces, as a result of which control of the machine is possible in slow running at a speed which is just above a speed at which contact would occur at the sliding surfaces of the mechanical seal.

In order to allow for acquisition of a temperature of the slide rings that is as precise and quick as possible, the temperature sensor is preferably arranged directly on the stationary slide ring. The temperature sensor is preferably positioned in a blind hold in the stationary slide ring.

The present invention furthermore relates to a machine, for example a turbo compressor, a compressor, a pump or a stirrer, comprising a mechanical seal arrangement according to the invention which seals a product space with respect to an atmosphere at a rotating component such as a shaft. In this case, the machine comprises a control unit which is configured for performing a control of the machine. In this case, the evaluation unit of the mechanical seal arrangement is configured to receive further operating variables of the machine from the control unit of the machine, in particular a speed of the machine, a pressure of the medium to be sealed, and/or a temperature of the medium to be sealed, and/or an overall operating time duration of the machine since installation of the mechanical seal. In this case, the evaluation unit is configured to process the acquired variables of the measuring unit in conjunction with the received variables of the control unit, in order to make a statement regarding a state of wear of the mechanical seal arrangement. Further preferably, the evaluation unit is configured to transmit the measured variables acquired by the measuring unit to the control unit of the machine.

Figure 2:
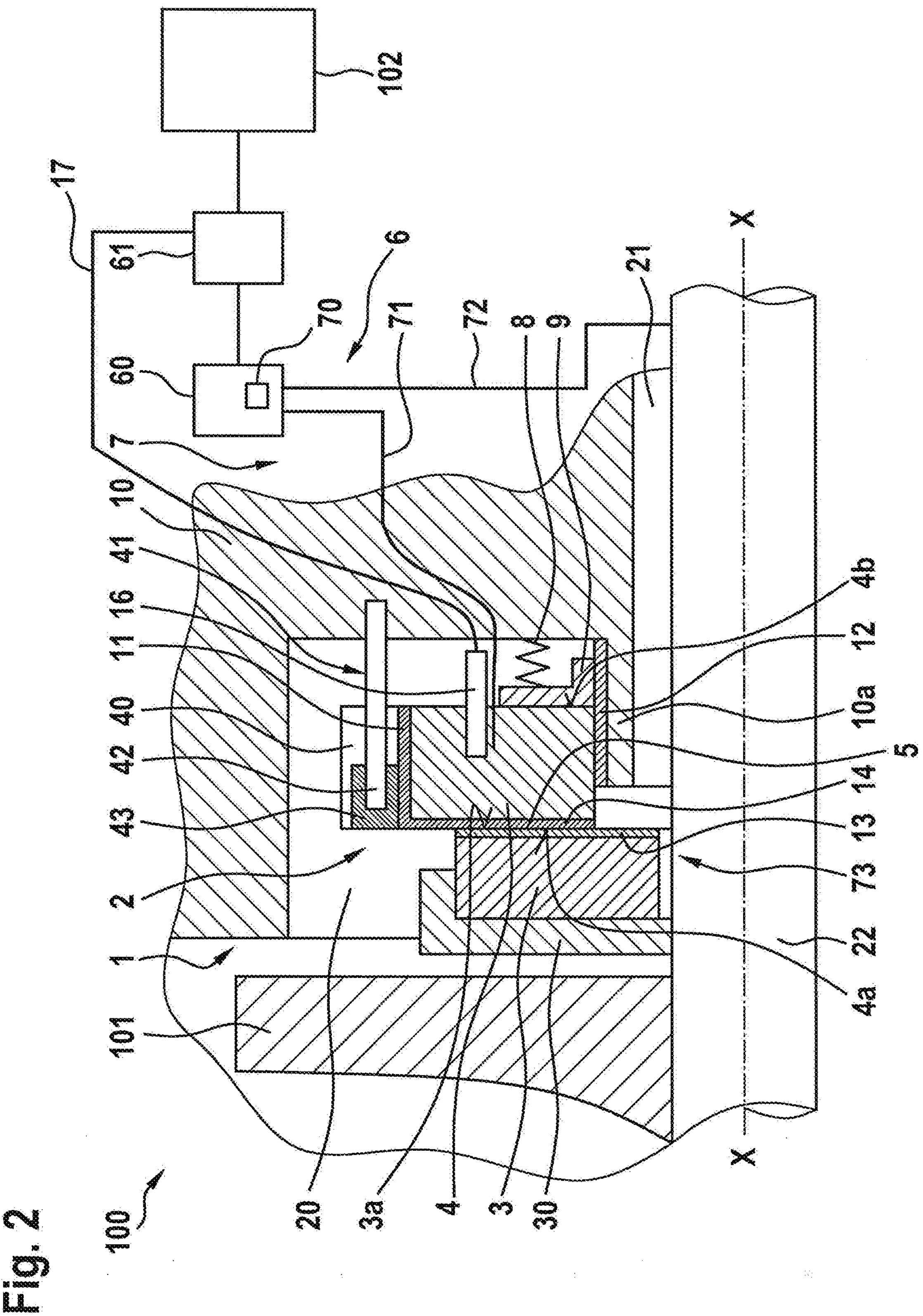
Figure 3:
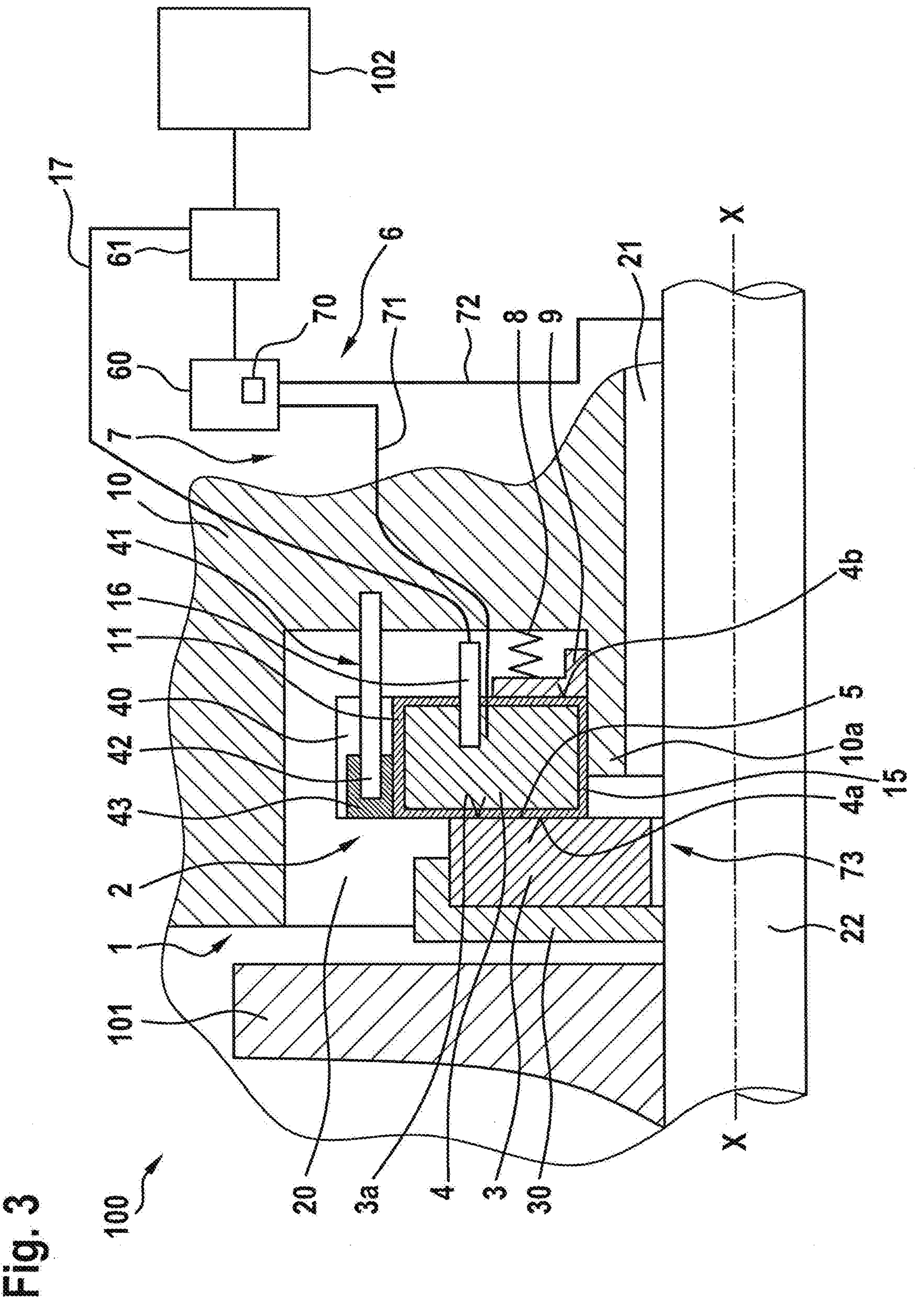

Preferred embodiments of the invention are described in detail in the following, with reference to the accompanying drawings, in which:

FIG. 1 is a schematic sectional view of a machine comprising a mechanical seal arrangement according to a first embodiment of the invention, FIG. 2 is a schematic sectional view of a machine comprising a mechanical seal arrangement according to a second embodiment of the invention, and FIG. 3 is a schematic sectional view of a machine comprising a mechanical seal arrangement according to a third embodiment of the invention.

A machine 100 comprising a mechanical seal arrangement 1 according to the invention is described in detail in the following with reference to FIG. 1.

The machine 100 is a compressor comprising compressor blades 101, wherein the mechanical seal arrangement 1 seals a product region 20 from an atmosphere region 21 at a rotating shaft 22.

As can be seen from FIG. 1, the mechanical seal arrangement 1 comprises a mechanical seal 2 having a rotating slide ring 3 and a stationary slide ring 4. A sealing gap 5 is defined between a sliding surface 3*a* of the rotating slide ring 3 and a sliding surface 4*a* of the stationary slide ring 4.

In this case, the rotating slide ring 3 is connected to the rotating shaft 22 by means of a slide ring carrier 30 and rotates together with said shaft.

The stationary slide ring 4 is arranged on a housing 10 and is provided so as to be axially movable. In this case, a pretensioning device 8, which acts on a rear side 4*b* of the stationary slide ring 4 via a pressure ring 9, is provided, such that the stationary slide ring 4 is preloaded in the axial direction X-X of the mechanical seal 2 against the rotating slide ring 3.

In order to prevent co-rotation of the stationary slide ring 4 together with the rotating slide ring 3 during operation, a torque transmission device 41 is provided. The torque transmission device 41 comprises a pin 42 and a cap 43. The cap 43 is produced from an electrically non-conductive material, preferably PEEK. In this case, the torque transmission device 41 is arranged in a groove 40 which is provided on an outer periphery of the stationary slide ring 4. The other free end of the pin 42 of the torque transmission device 41 is fixed in the housing 10. It is noted that a plurality of such pins are arranged in correspondingly formed grooves in the stationary slide ring along the periphery of the stationary slide ring 4, in order to prevent co-rotation of the stationary slide ring 4 during operation of the machine.

The rotating slide ring 3 and the stationary slide ring 4 are each produced from an electrically conductive material. The slide rings are preferably produced from an electrically conductive ceramic.

The mechanical seal arrangement 1 further comprises a monitoring device 6. The monitoring device 6 comprises an electrical circuit 7, a measuring unit 60 and an evaluation unit 61.

The electrical circuit 7 comprises a voltage source 70, a first line 71 which electrically connects the voltage source 70 to the stationary slide ring 4, a second line 72 which electrically connects the shaft 22 to the voltage source 70, and a capacitor 73.

The capacitor 73 is configured as a plate capacitor, wherein the plate capacitor is formed by the rotating slide ring 3 and the stationary slide ring 4, which are produced from an electrically conductive material. During operation of the machine, when the sealing gap 5 forms between the rotating slide ring 3 and the stationary slide ring 4, a barrier fluid, which is located in the sealing gap 5, forms a dielectric of the plate capacitor. As a result, the electrically conductive rotating slide ring 3 and the electrically conductive stationary slide ring 4 are electrically insulated from one another. In this embodiment, the dielectric is air. During standstill of the machine 100, the pretensioning device 8 preloads the stationary slide ring 4 in the direction towards the rotating slide ring 3, such that the sliding surfaces 3*a*, 4*a* of the two slide rings touch one another. As a result, the electrical circuit 7 is closed.

As can be seen from FIG. 1, the first line 71, which is electrically insulated, is guided through the housing 10 as far as into an opening in an interior region of the stationary slide ring 4, which opening is formed by the rear side 4*b* in the stationary slide ring. Thus, reliable electrical contacting of the stationary slide ring 4 by the first line 71, which is then of course no longer electrically insulated in the stationary slide ring 4, can be made possible.

Proceeding from the rotating slide ring 3, the electrical circuit 7 is the closed via the slide ring carrier 30, the shaft 22, which is produced form a metal and is also electrically conductive, and the second line 72, which leads back to the voltage source 70.

The measuring unit 60 is now configured to acquire changes of electrical variables of the electrical circuit 7. If for example there is wear on the sliding surfaces, typically a sealing gap magnitude of the sealing gap 5 in the axial direction X-X changes. As a result, the capacitance of the capacitor 73 formed by the slide rings changes, which can accordingly be acquired by the measuring unit 60.

The acquired electrical measured variables are supplied to the evaluation unit 61, which can then perform a comparison with for example preceding measured variables which were acquired by the measuring unit 60 and/or can also perform a comparison with predetermined comparison variables. Depending on the comparison, then for example a warning message can be emitted in the event of identified wear on the sliding surfaces.

The evaluation unit 60 is furthermore connected to a control unit 102 of the machine 100. As a result, a data exchange with the evaluation unit 61 and the control unit 102 can take place. For example, upon identification of wear on the sliding surfaces, the control unit 102 can be configured such that corresponding adjustment of operating parameters of the machine 100, for example a reduction of a speed, can be carried out, in order to prevent complete damage of the mechanical seal 2. Optionally, a complete standstill of the machine 100 can also be arranged.

The connection between the control unit 102 and the evaluation unit 61 also makes it possible for the control unit 102 to transmit operating data to the evaluation unit 61, for example speed of the shaft 102, temperature of the medium in the product region 20, pressure in the product region 20 and/or total running time of the machine 100, wherein the evaluation unit 61 can then perform an evaluation based on the acquired electrical variables and the operating variables which were supplied by the control unit 102.

The stationary slide ring 4 is formed, for electrical insulation, on the groove 40, in which the torque transmission device 41 is arranged, with a first electrically non-conductive coating 11. A second electrically non-conductive coating 12 is provided on the housing 10 on a sleeve-like projection 10*a*, in which the stationary slide ring 4 is arranged so as to be axially movable. As a result, the stationary slide ring 4 is reliably electrically insulated from the other components, in particular the housing 10, and the torque transmission device 41. Should wear occur at the first and/or second coating 11, 12, this would also lead to a change in electrical variables of the electrical circuit 7, which can be acquired by the measuring unit 60 and correspondingly the evaluation unit 61.

Furthermore, the mechanical seal arrangement 1 comprises a temperature sensor 16. The temperature sensor 16 is arranged in a blind hole formed in the stationary slide ring 4 and is connected to the evaluation unit 61 via a connecting line 17.

The temperature sensor 16 is configured for acquiring a temperature of the stationary slide ring. During normal operation of the mechanical seal arrangement, i.e. when the sealing gap 5 is formed between the sliding surfaces 3*a*, 4*a* of the slide rings, a temperature of the slide rings is typically constant at a predetermined level. Should longer contact occur at the sliding surfaces 3*a*, 4*a* of the slide rings during operation, contact friction occurs, which leads to a jump-like temperature increase at the sliding surfaces and correspondingly the slide rings. This temperature increase can be acquired by the temperature sensor 16 and processed in the evaluation unit. In this case, the evaluation unit is configured to determine a change in a magnitude of the sealing gap at the sliding surfaces based on the temperature change.

The evaluation unit 61 can thus conclude, during operation, due to the temperature increase, that there must have been contact at the sliding surfaces, leading to an increased contact friction and thus a temperature increase, and can take corresponding countermeasures. Even in the case of slow running, the evaluation unit can relatively accurately determine, based on a temperature change, a speed at which the mechanical seal is not quite yet in contact on the sliding surfaces. Since such slow running often lasts for several hours or days, slow running should be carried out as far as possible at low speeds, but the speed should not be so low that contact occurs at the sliding surfaces during slow running, which would damage the mechanical seal. Thus, slow running can be optimized by the additional use of the temperature sensor.

Longer slow running may also be necessary when starting up the machine, wherein it must be ensured that a speed is selected, even in the startup state, at which the sliding surfaces of the slide rings lift off one another and the sealing gap forms between the slide rings. Only then can the slow running be carried out without damage to the mechanical seal.

Furthermore, the temperature sensor can enable a redundant acquisition of contact of the sliding surfaces, since in the case of contact at the sliding surfaces, as described above, the electrical circuit of the monitoring device 6 is closed, which is immediately acquired by the measuring unit 60. In a redundant manner with respect thereto, in the case of contact at the sliding surfaces a jump-like temperature increase at the slide rings also occurs, which can be acquired by the temperature sensor 16. Thus, redundant acquisition of contact at the sliding surfaces of the slide rings is possible.

Thus, according to the invention, a simply configured monitoring device 6 can be implemented which allows for statements to be made regarding a state of the mechanical seal arrangement 1. In this case, the monitoring device 6 is extremely robust, such that the monitoring device 6 can in particular also be used in the case of mechanical seal arrangements 1 which must perform a sealing task under extreme conditions. In particular, sensitive measuring equipment can be omitted. The measuring unit 60 and the evaluation unit 61 can be arranged remotely from the product region 20 and can for example be arranged in corresponding protective housings or the like. Furthermore, it is possible that established structural units of mechanical seal arrangements can be taken over without changes, in particular the torque transmission device 41 and the pretensioning device.

FIG. 2 shows a machine 100 and a mechanical seal arrangement 1 according to a second preferred embodiment of the invention. Identical or functionally identical parts are denoted by the same reference signs as in the first embodiment.

In the second embodiment, a third coating 13 is formed on the sliding surface 3*a* of the rotating slide ring 3, and a fourth coating 14 is formed on the sliding surface 4*a* of the stationary slide ring 4, The two coatings 13, 14 are produced from an electrically non-conductive material, for example DLC. As a result, in the second embodiment a change relating to the electrical circuit 7 occurs compared with the first embodiment, such that in the case of standstill of the machine, when the sliding surfaces 3*a*, 4*a* of the slide rings touch one another, the electrical circuit 7 is not closed. This can be acquired by the measuring unit 6. Should wear occur at the sliding surfaces, such that the coatings 13, 14 are worn, in the case of contact between the sliding surfaces the electrical circuit 7 would be closed, which can be detected directly by the measuring unit 60 and the evaluation unit 61.

In this case, it is noted that, during operation, contact of the slide rings can occur not only upon standstill of the machine 100, but rather also in the case of a reduced speed, for example for a reversal of direction of a direction of rotation of the shaft 22 or for slow running. Wear on the sliding surfaces can for example also be detected if contact is nonetheless detected by the closed electrical circuit 7 at operating speeds at which no contact can occur when the coating 13, 14 is intact.

It is noted that the wear can of course also be detected if only one of the two sliding surfaces comprises an electrically non-conductive coating.

However, providing the temperature sensor 16 makes it possible for contact at the sliding surfaces of the mechanical seal to be acquired despite the electrically non-conductive coatings on the sliding surfaces, if contact friction occurs during slow running due to the contact at the sliding surfaces, which friction leads to a temperature increase of the slide ring. The temperature sensor 16 can detect the temperature increase at the stationary slide ring 4, and the evaluation unit 61 can conclude that there is contact at the sliding surfaces, based on the temperature change, and can make a statement regarding a magnitude of the sealing gap.

Otherwise, this embodiment corresponds to the first embodiment, and therefore reference can be made to the description given there.

FIG. 3 shows a machine 100 comprising a mechanical seal arrangement 1 according to a third preferred embodiment of the invention. Identical or functionally identical parts are again denoted by the same reference signs as in the previous embodiment.

As can be seen from FIG. 3, in the third embodiment the stationary slide ring 4 is configured such that a coating 15 is formed on all the outer surfaces of the stationary slide ring 4. The coating 15 is again produced from an electrically non-conductive material. The coating 15 is thus provided on the sliding surface 4*a* of the stationary slide ring, on the rear side 4*b*, on an inner peripheral side, and on an outer peripheral side. The stationary slide ring 4 is thus completely electrically insulated by the coating 15. During operation it is then possible to conclude wear of the coating 15, in particular at the sliding surface 4, as in the second embodiment, when the electrical circuit is closed. In the case of wear on the inner periphery and on the outer periphery this can also be detected, since then a short-circuit via the housing 10 may occur. In this case, the electrically non-conductive coating 15 can be applied to the stationary slide ring 4 in one step, such that the monitoring device 6 can be provided in a particularly cost-effective manner.

Contact at the sliding surfaces can again also be concluded by the temperature sensor 16 on account of a jump-like temperature change at the stationary slide ring 4.

The complete electrical all-around insulation of the stationary slide ring 4 means that no other electrical insulation has to be provided on the mechanical seal arrangement 1. As a result, established components of the mechanical seal arrangement 1 can be used unchanged. Otherwise, the third embodiment corresponds to the preceding embodiments, and therefore reference can be made to the description given there.

LIST OF REFERENCE SIGNS

1 mechanical seal arrangement
2 mechanical seal

3 rotating slide ring
3*a* sliding surface of the rotating slide ring
4 stationary slide ring
4*a* sliding surface of the stationary slide ring
4*b* rear side of the stationary slide ring
5 sealing gap
6 monitoring device
7 electrical circuit
8 pretensioning device
9 pressure ring
10 housing
10*a* sleeve-like projection of the housing
11 first electrically non-conductive coating
12 second electrically non-conductive coating
13 third electrically non-conductive coating
14 fourth electrically non-conductive coating
15 electrically non-conductive coating on all the outer surfaces of the stationary slide ring
16 temperature sensor
17 connecting line
20 product region
21 atmosphere region
22 shaft
30 slide ring carrier
40 groove
41 torque transmission device
42 pin
43 cap
60 measuring unit
61 evaluation unit
70 voltage source
71 first line
72 second line
73 capacitor
100 machine
101 compressor blade
102 control unit of the machine
X-X axial direction

The invention claimed is:

1. Mechanical seal arrangement configured for sealing at a rotating component, comprising:

a mechanical seal having a rotating slide ring having a sliding surface and a stationary slide ring having a sliding surface, which define a sealing gap between the sliding surfaces, wherein the rotating slide ring and the stationary slide ring are produced from an electrically conductive material, wherein the rotating slide ring is electrically connected to the rotating component, and a monitoring device comprising an electrical circuit, a measuring unit and an evaluation unit, wherein the electrical circuit comprises a first line which electrically connects the stationary slide ring to a voltage source, a second line which electrically connects the rotating component to the voltage source, and a capacitor, wherein the capacitor is configured as a plate capacitor, wherein the plate capacitor is formed by the rotating slide ring and the stationary slide ring, wherein the measuring unit is configured to acquire changes of electrical variables of the electrical circuit, and wherein the evaluation unit is configured to perform an evaluation of the electrical variables acquired by the measuring unit.

2. Mechanical seal arrangement according to claim 1, wherein a barrier fluid in the sealing gap is a dielectric.

3. Mechanical seal arrangement according claim 1, wherein at least one of the sliding surfaces of the slide rings comprises an electrically non-conductive coating.

4. Mechanical seal arrangement according to claim 1, wherein an electrically non-conductive element is arranged between the stationary slide ring and a housing, for electrical insulation.

5. Mechanical seal arrangement according to claim 4, wherein the electrically non-conductive element is an electrically non-conductive coating.

6. Mechanical seal arrangement according to claim 1, further comprising a torque transmission device which is arranged between the stationary slide ring and the housing, wherein the torque transmission device is electrically insulated with respect to the stationary slide ring and/or with respect to the housing.

7. Mechanical seal arrangement according to claim 1, further comprising a pretensioning device and a pressure ring, which are arranged on a rear side of the stationary slide ring, wherein the pretensioning device preloads the stationary slide ring in the axial direction, and wherein the pressure ring is produced from an electrically non-conductive material, in order to electrically insulate the pretensioning device relative to the stationary slide ring.

8. Mechanical seal arrangement according to claim 1, wherein the stationary slide ring comprises an electrically non-conductive coating in full on all outer surfaces.

9. Mechanical seal arrangement according to claim 1, wherein the evaluation unit is furthermore configured for identifying deviations by a comparison of the electrical measured variables acquired by the measuring unit with comparison variables.

10. Mechanical seal arrangement according to claim 1, wherein the evaluation unit is furthermore configured for determining a magnitude of the sealing gap in the axial direction (X-X) during operation, on the basis of the acquired electrical measured variables of the measuring unit.

11. Mechanical seal arrangement according to claim 1, further comprising a temperature sensor which is connected to the evaluation unit and is configured for acquiring a temperature of at least one slide ring.

12. Mechanical seal arrangement according to claim 11, wherein the evaluation unit is configured to determine a change in a sealing gap magnitude between the sliding surfaces based on a temperature change of the slide ring.

13. Mechanical seal arrangement according claim 11, wherein the temperature sensor is arranged on the stationary slide ring.

14. Machine, comprising a rotating component, a mechanical seal arrangement according to claim 1, and a control unit, wherein the control unit is configured for controlling the machine, and wherein the evaluation unit is configured for obtaining operating variables of the electrical machine and for performing monitoring of the mechanical seal arrangement in conjunction with the electrical measured variables of the measuring unit.

15. Machine according to claim 14, wherein the evaluation unit is configured for transmitting comparison results to the control unit of the machine, and the control unit is configured for changing operating variables of the machine based on the comparison results.

* * * * *